(12) United States Patent
Numakami

(10) Patent No.: US 8,909,600 B2
(45) Date of Patent: Dec. 9, 2014

(54) INFORMATION PROCESSING APPARATUS, INFORMATION PROCESSING METHOD, AND STORAGE MEDIUM

(71) Applicant: Canon Kabushiki Kaisha, Tokyo (JP)

(72) Inventor: Yukio Numakami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/670,205

(22) Filed: Nov. 6, 2012

(65) Prior Publication Data

US 2013/0132338 A1    May 23, 2013

(30) Foreign Application Priority Data

Nov. 18, 2011    (JP) ................................ 2011-253137

(51) Int. Cl.
  *G06F 17/30*    (2006.01)
  *H04L 29/08*    (2006.01)
  *H04L 12/28*    (2006.01)

(52) U.S. Cl.
  CPC ...... *G06F 17/30575* (2013.01); *H04L 67/1095* (2013.01); *H04L 12/2812* (2013.01)
  USPC ........................................................ 707/610

(58) Field of Classification Search
  CPC .................. G06F 17/30575; G06F 17/30581; G06F 17/30368
  USPC ........................................................... 707/610
  See application file for complete search history.

(56) References Cited

U.S. PATENT DOCUMENTS

| | | | |
|---|---|---|---|
| 6,925,476 B1* | 8/2005 | Multer et al. | 1/1 |
| 2009/0198772 A1* | 8/2009 | Kim et al. | 709/203 |
| 2010/0031366 A1* | 2/2010 | Knight et al. | 726/26 |
| 2012/0296870 A1* | 11/2012 | Fu et al. | 707/625 |

FOREIGN PATENT DOCUMENTS

| | | |
|---|---|---|
| JP | 2010-529550 A | 8/2010 |
| WO | WO 2008/150112 A1 | 12/2008 |

* cited by examiner

*Primary Examiner* — Joshua Bullock
(74) *Attorney, Agent, or Firm* — Fitzpatrick, Cella, Harper & Scinto

(57) ABSTRACT

There is provided with an information processing apparatus. A holding unit is configured to hold a communication parameter to be used to perform communication with a storage device configured to store a content. A storage unit is configured to store a content. A memory unit is configured to store a record of change for the content stored in the storage unit. A deletion unit is configured to delete, from the memory unit, the record of change used to synchronize the content stored in the storage unit with the content stored in the storage device in accordance with deletion of the communication parameter used to perform the communication with the storage device from the holding unit.

15 Claims, 10 Drawing Sheets

F I G. 3
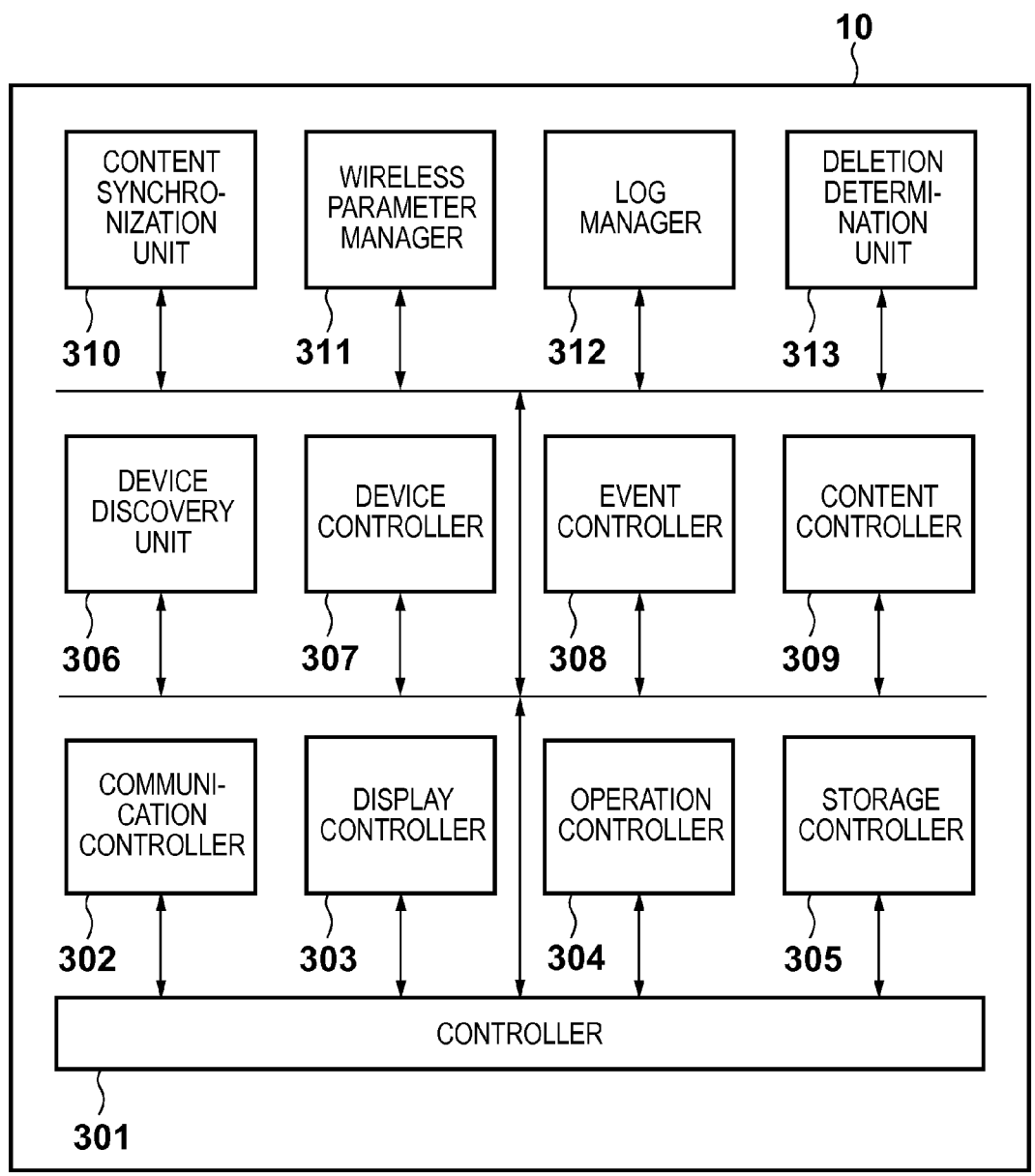

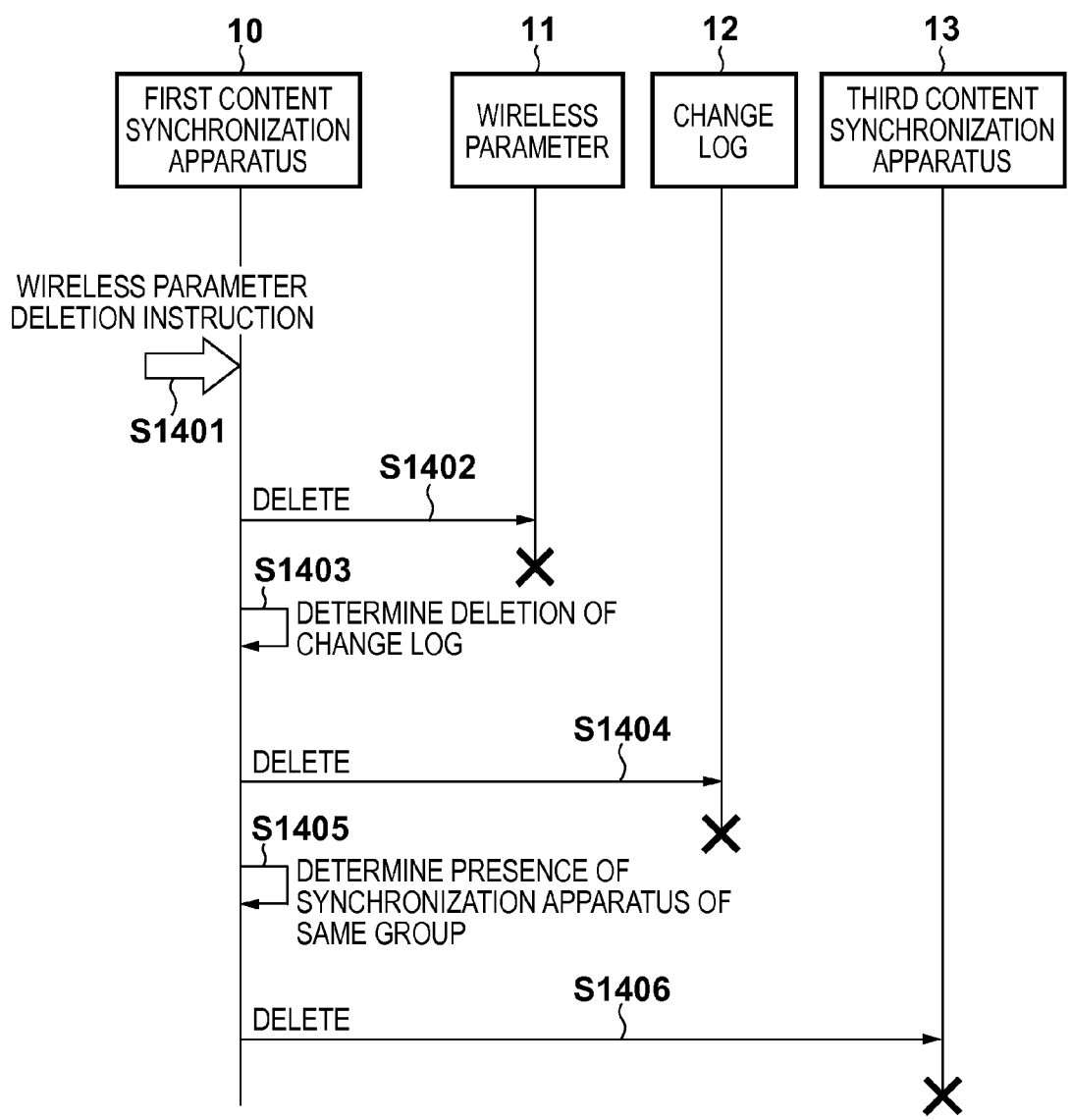

INFORMATION PROCESSING APPARATUS, INFORMATION PROCESSING METHOD, AND STORAGE MEDIUM

BACKGROUND OF THE INVENTION

1. Field of the Invention

The present invention relates to an information processing technique and, more particularly, to a content synchronization technique.

2. Description of the Related Art

In recent years, a communication standard called UPnP (Universal Plug And Play) has attracted attention, which connects devices via a home network to share contents such as images, moving images, audios, and the like. In UPnP, a content synchronization service called CSS (Content Synchronized Service) is defined. The CSS allows to synchronize (add, delete, and change) contents or metadata of contents among a plurality of CDSs (Content Directory Services).

Japanese Patent Laid-Open No. 2010-529550 discloses a technique of causing a control point to, using the CSS, establish a synchronization relationship with a content provided by a CDS on a network. According to the method described in Japanese Patent Laid-Open No. 2010-529550, the update history of a synchronization target content is managed as a change log before the start of content synchronization. When performing content synchronization, the change log is exchanged, and the content is exchanged based on the change log. The change log is maintained even after the content synchronization, and used again in content synchronization of the next time.

According to the method described in Japanese Patent Laid-Open No. 2010-529550, however, the amount of the change log gradually increases when content synchronization is performed with various devices.

SUMMARY OF THE INVENTION

In order to solve this problem, an information processing apparatus according to the present invention has the following arrangement.

According to one aspect of the present invention, an information processing apparatus comprises: a holding unit configured to hold a communication parameter to be used to perform communication with a storage device configured to store a content; a storage unit configured to store a content; a memory unit configured to store a record of change for the content stored in the storage unit; a transmission unit configured to transmit the record of change to the storage device to synchronize the content stored in the storage unit with the content stored in the storage device; and a deletion unit configured to delete, from the memory unit, the record of change used to synchronize the content stored in the storage unit with the content stored in the storage device in accordance with deletion of the communication parameter used to perform the communication with the storage device from the holding unit.

According to another aspect of the present invention, an information processing method comprises: a holding step of holding, in a holding unit, a communication parameter to be used to perform communication with a storage device configured to store content; a memory step of storing a record of change for the content stored in a storage unit, in a memory unit; a transmission step of transmitting the record of change to the storage device to synchronize the content stored in the storage unit with the content stored in the storage device; and a deletion step of deleting, from the memory unit, the record of change used to synchronize the content stored in the storage unit with the content stored in the storage device in accordance with deletion of the communication parameter used to perform the communication with the storage device from the holding unit.

According to still another aspect of the present invention, a non-transitory computer-readable storage medium stores a program which is executed by a computer to perform a method comprising: a holding step of holding, in a holding unit, a communication parameter to be used to perform communication with a storage device configured to store a content; a memory step of storing a record of change for the content stored in a storage unit, in a memory unit; a transmission step of transmitting the record of change to the storage device to synchronize the content stored in the storage unit with the content stored in the storage device; and a deletion step of deleting, from the memory unit, the record of change used to synchronize the content stored in the storage unit with the content stored in the storage device in accordance with deletion of the communication parameter used to perform the communication with the storage device from the holding unit.

Further features of the present invention will become apparent from the following description of exemplary embodiments (with reference to the attached drawings).

BRIEF DESCRIPTION OF THE DRAWINGS

FIG. 3 is a functional block diagram of the first content synchronization apparatus 10 according to the first embodiment;

FIG. 12 is a sequence chart of change log deletion processing according to the second embodiment.

DESCRIPTION OF THE EMBODIMENTS

The embodiments of the present invention will now be described with reference to the accompanying drawings. However, the scope of the present invention is not limited to the following embodiments.

[First Embodiment]

Figure 1:
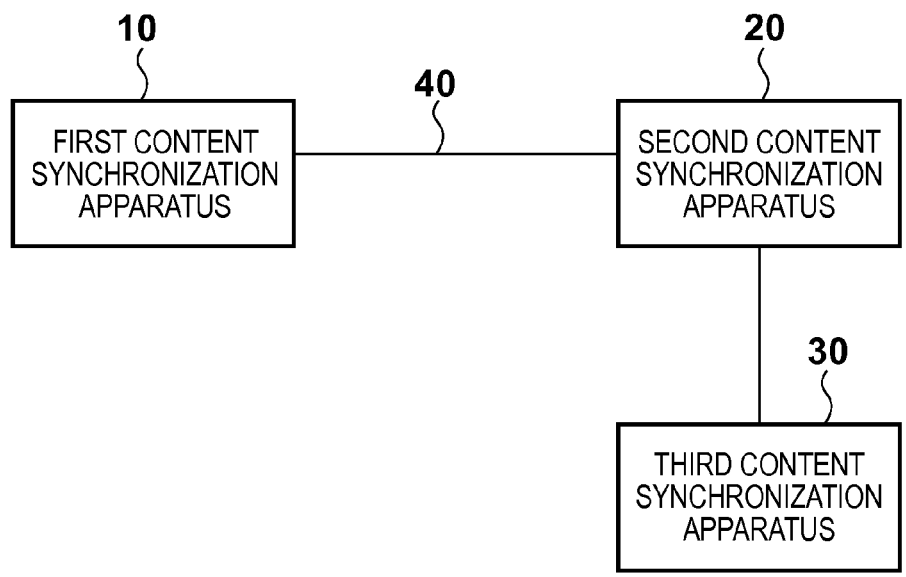
FIG. 1 is a block diagram showing an example of the arrangement of a content synchronization system according to the first embodiment.

FIG. 1 is a block diagram showing an example of the arrangement of a content synchronization system according to this embodiment. A first content synchronization apparatus 10 is a content synchronization apparatus (information processing apparatus) in a home network according to this embodiment. The first content synchronization apparatus 10 offers a content synchronization service to a second content synchronization apparatus 20 on a wireless LAN (Local Area Network) 40. The first content synchronization apparatus 10 executes content synchronization with the second content synchronization apparatus 20.

In this embodiment, the first content synchronization apparatus 10 has CSS and CDS of UPnP. Detailed examples of the first content synchronization apparatus 10 are a home server apparatus, a NAS (Network Attached Storage) apparatus, a camera apparatus, a video camera apparatus, and a PC apparatus. Note that the first content synchronization apparatus according to this embodiment has a CSS function of UPnP. However, the first content synchronization apparatus may have another function of offering a content synchronization service in the home network in place of or in addition to the CSS function.

The second content synchronization apparatus 20 is another content synchronization apparatus in the home network according to this embodiment, like the first content synchronization apparatus 10. In this embodiment, the second content synchronization apparatus 20 has the same arrangement as that of the first content synchronization apparatus 10. A third content synchronization apparatus 30 is still another content synchronization apparatus in the home network according to this embodiment, like the first content synchronization apparatus 10. In this embodiment, the third content synchronization apparatus 30 has the same arrangement as that of the first content synchronization apparatus 10.

The wireless LAN 40 is the home network according to this embodiment. In this embodiment, the wireless LAN is used as the home network. However, any other network such as a wired LAN, WAN (Wide Area Network), ad hoc network, Bluetooth®, Zigbee®, or UWB is also usable as the home network.

In this embodiment, the first content synchronization apparatus 10 and the second content synchronization apparatus 20 communicate with each other. In this embodiment, the first content synchronization apparatus 10 and the second content synchronization apparatus 20 are connected via a P2P group complying with Wi-Fi Direct, although the communication method is not particularly limited. Instead of Wi-Fi Direct, WPS (Wi-Fi Protected Setup), WPSE (WPS Extension), ad hoc connection, or the like may be used. In this embodiment, the second content synchronization apparatus 20 is defined as the P2P group owner of Wi-Fi Direct. The first content synchronization apparatus 10 is defined as the P2P group client of Wi-Fi Direct.

An example of a use case of this embodiment is as follows. The user of the first content synchronization apparatus 10, who is, for example, out of the home, wants to execute content synchronization with the second content synchronization apparatus 20 owned by a friend. At this time, the user connects the first content synchronization apparatus 10 to the second content synchronization apparatus 20 via Wi-Fi Direct by the push-button system. The user instructs the first content synchronization apparatus 10 to start content synchronization with the second content synchronization apparatus 20. After the end of content synchronization, the user ends wireless connection from the first content synchronization apparatus 10. After that, determining not to perform wireless communication connection to the second content synchronization apparatus 20 in the future, the user deletes an unnecessary wireless parameter 11 for the second content synchronization apparatus 20. In this embodiment, the first content synchronization apparatus 10 deletes a change log 12 generated upon executing content synchronization with the second content synchronization apparatus 20 together.

Figure 2:
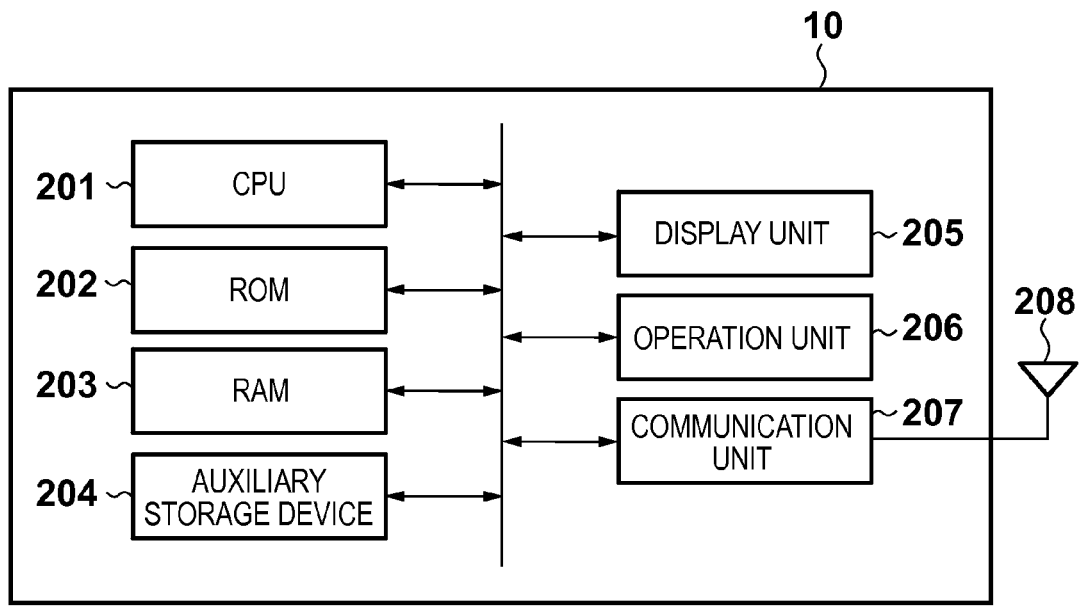
FIG. 2 is a block diagram showing an example of the hardware arrangement of a first content synchronization apparatus 10 according to the first embodiment.

FIG. 2 is a block diagram showing an example of the hardware arrangement of the first content synchronization apparatus 10 according to this embodiment. The first content synchronization apparatus 10 is an apparatus having a communication function of communicating with another apparatus, for example, a network control apparatus. As shown in FIG. 2, the first content synchronization apparatus 10 according to this embodiment can be implemented by a computer including a CPU and a memory. However, the first content synchronization apparatus 10 may be implemented using dedicated hardware for implementing some or all functions shown in FIG. 3. The first content synchronization apparatus 10 can be, for example, one of various household electric appliances such as a camera, a cellular phone, or a computer system such as a PC or a workstation. The first content synchronization apparatus 10 may be implemented by combining a plurality of apparatuses.

A CPU (Central Processing Unit) 201 controls the entire first content synchronization apparatus 10. A ROM (Read Only Memory) 202 stores programs and parameters that are need not be changed. A RAM (Random Access Memory) 203 temporarily stores programs, data, and the like supplied from an auxiliary storage device or the like. An auxiliary storage device 204 stores images, moving images, and the like as content data (storage unit). Examples of the auxiliary storage device 204 are a memory card and a hard disk. A computer program is read out from a storage device such as the ROM 202 or the auxiliary storage device 204 to the RAM 203. The CPU 201 controls the units in accordance with the computer program, thereby implementing processing according to the embodiment.

A display unit 205 presents information to the user. For example, the display unit 205 can display a GUI (Graphical User Interface) used by the user to operate the first content synchronization apparatus 10. An operation unit 206 is an input interface used by the user to operate the first content synchronization apparatus 10. A communication unit 207 communicates with another apparatus via a wireless LAN antenna 208. For example, the communication unit 207 can communicate with the second content synchronization apparatus 20.

FIG. 3 is a functional block diagram showing an example of the functional arrangement of the first content synchronization apparatus 10 according to this embodiment. A controller 301 controls each of functional modules 302 to 313 of the first content synchronization apparatus 10. The communication controller 302 controls the communication unit 207 and causes it to communicate with another apparatus. In this embodiment, the communication controller 302 controls communication with the second content synchronization apparatus 20. In this embodiment, the communication controller 302 controls communication in accordance with the push-button system of Wi-Fi Direct.

The display controller 303 controls the display unit 205 and causes it to display information. In this embodiment, the display controller 303 controls display of a GUI on the first content synchronization apparatus 10. The operation controller 304 controls the operation unit 206 and acquires user input. The storage controller 305 controls the auxiliary storage device 204 and causes it to store image content data, moving image content data, and content metadata.

The device discovery unit 306 receives a packet from the communication controller 302 and performs SSDP (Simple Service Discovery Protocol) processing of UPnP. The device discovery unit 306 also publicizes, onto the wireless LAN 40 via the communication controller 302, that the first content synchronization apparatus 10 has CSS and CDS and exists on the wireless LAN 40. This is called an alive message in SSDP. The device discovery unit 306 can thus notify the second content synchronization apparatus 20 of the presence of the first content synchronization apparatus 10. The device discovery unit 306 can also discover anther UPnP service on the wireless LAN 40. The device discovery unit 306 also sends a response to another UPnP apparatus that is going to discover a UPnP service. In this embodiment, SSDP processing is used for service discovery (device discovery). However, the present invention is not limited to this method. For example, any other method such as WS-Discovery or a MAC (Media Access Control) address may be used.

The device controller 307 receives a packet from the communication controller 302 and performs SOAP (Simple Object Access Protocol) processing of UPnP. The device controller 307 also sends a request to another UPnP service. The device controller 307 also accepts a UPnP service request from another UPnP apparatus and responds to the service request. In this embodiment, SOAP processing is used for the service request. However, the present invention is not limited to this method. For example, any other method of executing a remote object, for example, remote procedure call may be used.

The event controller 308 receives a packet from the communication controller 302 and performs GENA (General Event Notification Architecture) processing of UPnP. The event controller 308 notifies another UPnP apparatus on the wireless LAN 40 of an event. The event controller 308 also subscribes to an event of a UPnP service of another UPnP apparatus. In this embodiment, GENA processing is used for event notification. However, the present invention is not limited to this. For example, any other method such as WS-Eventing or WS-Notification may be used.

The content controller 309 performs CDS processing of UPnP. In this embodiment, the content controller 309 offers contents and content metadata stored in the storage controller 305 to the second content synchronization apparatus 20. The content synchronization unit 310 performs CSS processing of UPnP. In this embodiment, the content synchronization unit 310 executes content synchronization with the second content synchronization apparatus 20. The content synchronization unit 310 has a CSS service function and a CSS control point function.

The wireless parameter manager 311 manages, for each apparatus, a communication parameter used for wireless communication with another apparatus (parameter management unit). Since wireless communication is performed in this embodiment, the communication parameter will be referred to as a wireless parameter hereinafter. The communication controller 302 controls communication with another apparatus using the wireless parameter. In this embodiment, the other apparatus includes the second content synchronization apparatus 20 (first other apparatus). The wireless parameter manager 311 manages the wireless parameter 11 used for communication with the second content synchronization apparatus 20. In this embodiment, the wireless parameter includes SSID, encryption information, and the like as information necessary for Wi-Fi Direct. In this embodiment, the wireless parameter manager 311 acquires the wireless parameter 11 from the second content synchronization apparatus 20 at the time of wireless communication with the second content synchronization apparatus 20. The wireless parameter manager 311 stores the acquired wireless parameter in a storage medium such as the RAM 203 or the auxiliary storage device 204 via the storage controller 305.

The log manager 312 manages the change log 12 which is necessary when executing content synchronization (log management unit). The change log is a record of change representing details of changes of contents in the first content synchronization apparatus 10 (in particular, contents in the auxiliary storage device 204 (storage unit)) from the past content synchronization with another apparatus. The change log is managed for each apparatus which is a partner of content synchronization. Content synchronization is done by referring to the change log. In this embodiment, the log manager 312 generates the change log 12 in response to a content synchronization relationship establishment request. The log manager 312 stores the generated change log in a storage medium such as the RAM 203 or the auxiliary storage device 204 via the storage controller 305.

The deletion determination unit 313 determines whether to delete the change log 12 managed by the log manager 312. If the wireless parameter 11 is deleted by the wireless parameter manager 311, the deletion determination unit 313 decides to delete the change log 12. At this time, the deletion determination unit 313 causes the log manager 312 to delete the change log 12 (deletion unit).

Figure 4:
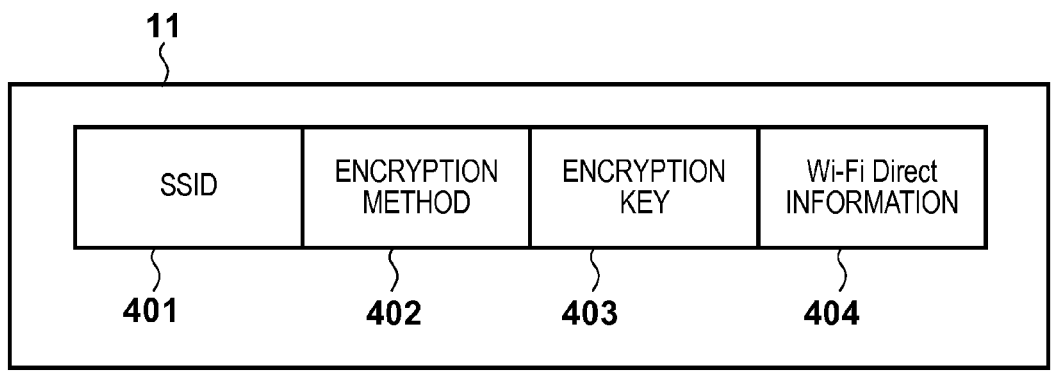
FIG. 4 is a view showing an example of the structure of a wireless parameter 11 according to the first embodiment.

FIG. 4 is a view showing the structure of the wireless parameter 11 used in this embodiment. An SSID 401 is the identifier of an access point in the wireless LAN 40. An encryption method 402 is information indicating an encryption communication method. An encryption key 403 is key information when executing encrypted communication. Wi-Fi Direct information 404 is information necessary for wireless communication connection by Wi-Fi Direct. The Wi-Fi Direct information 404 includes, for example, a connection type (temporary or persistent) and a P2P group ID.

Figure 5:
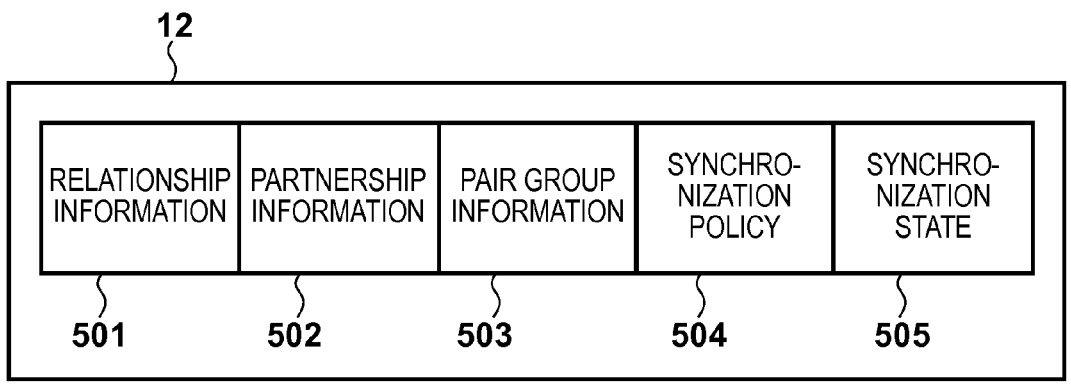
FIG. 5 is a view showing an example of the structure of a change log 12 according to the first embodiment.

FIG. 5 is a view showing the structure of the change log 12 used in this embodiment. Relationship information 501 is information indicating the synchronization relationship between a plurality of CDSs that execute content synchronization. The relationship information 501 includes a plurality of pieces of partnership information 502. The partnership information 502 is information indicating the synchronization relationship between two CDSs that execute content synchronization. The partnership information 502 includes a plurality of pieces of pair group information 503.

When the three apparatuses, that is the first content synchronization apparatus 10, the second content synchronization apparatus 20, and the third content synchronization apparatus 30 execute content synchronization, the partnership information 502 includes the P2P group ID in the Wi-Fi Direct information 404. Hence, the first content synchronization apparatus 10 can know, from the change log 12, the presence of the third content synchronization apparatus 30 belonging to the same P2P group. In this embodiment, the partnership information 502 includes the P2P group ID. However, the present invention is not limited to this method. For example, the change log 12 may hold a table that makes the partnership information 502 corresponds to the P2P group ID.

The pair group information 503 is information indicating the corresponding relationship of the synchronization target content between two CDSs that execute content synchronization. A synchronization policy 504 is information indicating a policy when executing content synchronization. Detailed examples of the synchronization policy 504 are replacement, merging only a content, and merging including metadata. A synchronization state 505 is information indicating the synchronization state of a synchronization target content. Detailed examples of the synchronization state 505 are new, updated, deleted, and synchronized.

Figure 6:
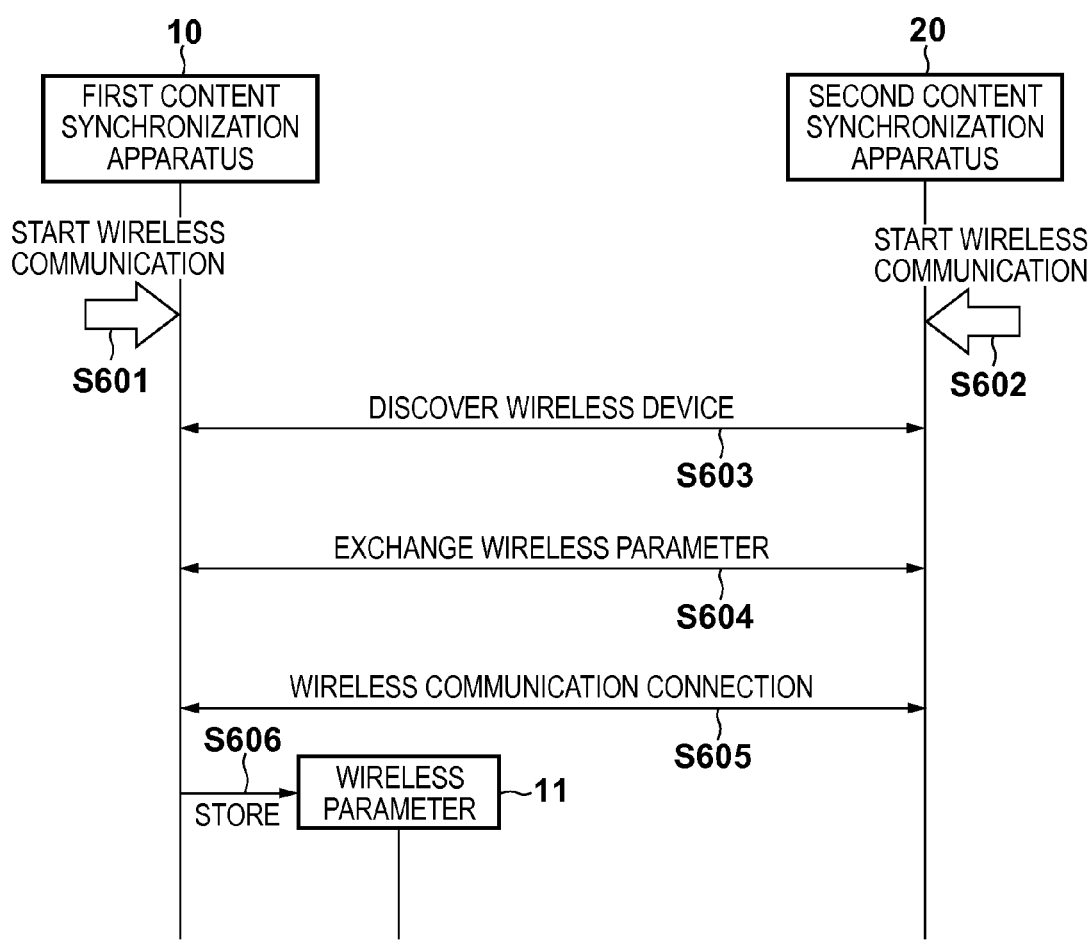
FIG. 6 is a sequence chart of wireless communication connection processing according to the first embodiment.

FIG. 6 illustrates the procedure of causing the first content synchronization apparatus 10 according to this embodiment to start wireless communication connection to the second content synchronization apparatus 20. In step S601, the operation controller 304 of the first content synchronization apparatus 10 detects a wireless connection start instruction from the user by the push-button system of Wi-Fi Direct. In step S602, the operation controller 304 of the second content synchronization apparatus 20 detects a wireless connection start instruction from the user by the push-button system of Wi-Fi Direct.

In step S603, the communication controller 302 of the first content synchronization apparatus 10 discovers the second content synchronization apparatus 20 on the wireless LAN 40. In step S604, the communication controller 302 of the first content synchronization apparatus 10 exchanges the wireless parameter 11 with the second content synchronization apparatus 20 using Wi-Fi Direct. In step S605, the communication controller 302 of the first content synchronization apparatus 10 establishes wireless communication connection by Wi-Fi Direct with the second content synchronization apparatus 20 using the wireless parameter 11 acquired from the second content synchronization apparatus 20. In step S606, the wireless parameter manager 311 of the first content synchronization apparatus 10 stores the wireless parameter 11 acquired from the second content synchronization apparatus 20. The wireless parameter 11 is assumed to be stored in the auxiliary storage device 204 of the first content synchronization apparatus 10.

The wireless parameter 11 stored in step S606 includes information indicating whether the wireless communication connection is persistent or temporary. In step S606, the wireless parameter manager 311 of the first content synchronization apparatus 10 determines whether the wireless communication connection is persistent or temporary. This determination can be done based on, for example, user input. If the wireless communication connection is persistent, the wireless parameter manager 311 of the first content synchronization apparatus 10 includes, in the wireless parameter 11, information indicating that the wireless communication connection is persistent. If the wireless communication connection is temporary, the wireless parameter manager 311 of the first content synchronization apparatus 10 includes, in the wireless parameter 11, information indicating that the wireless communication connection is temporary.

Figure 7:
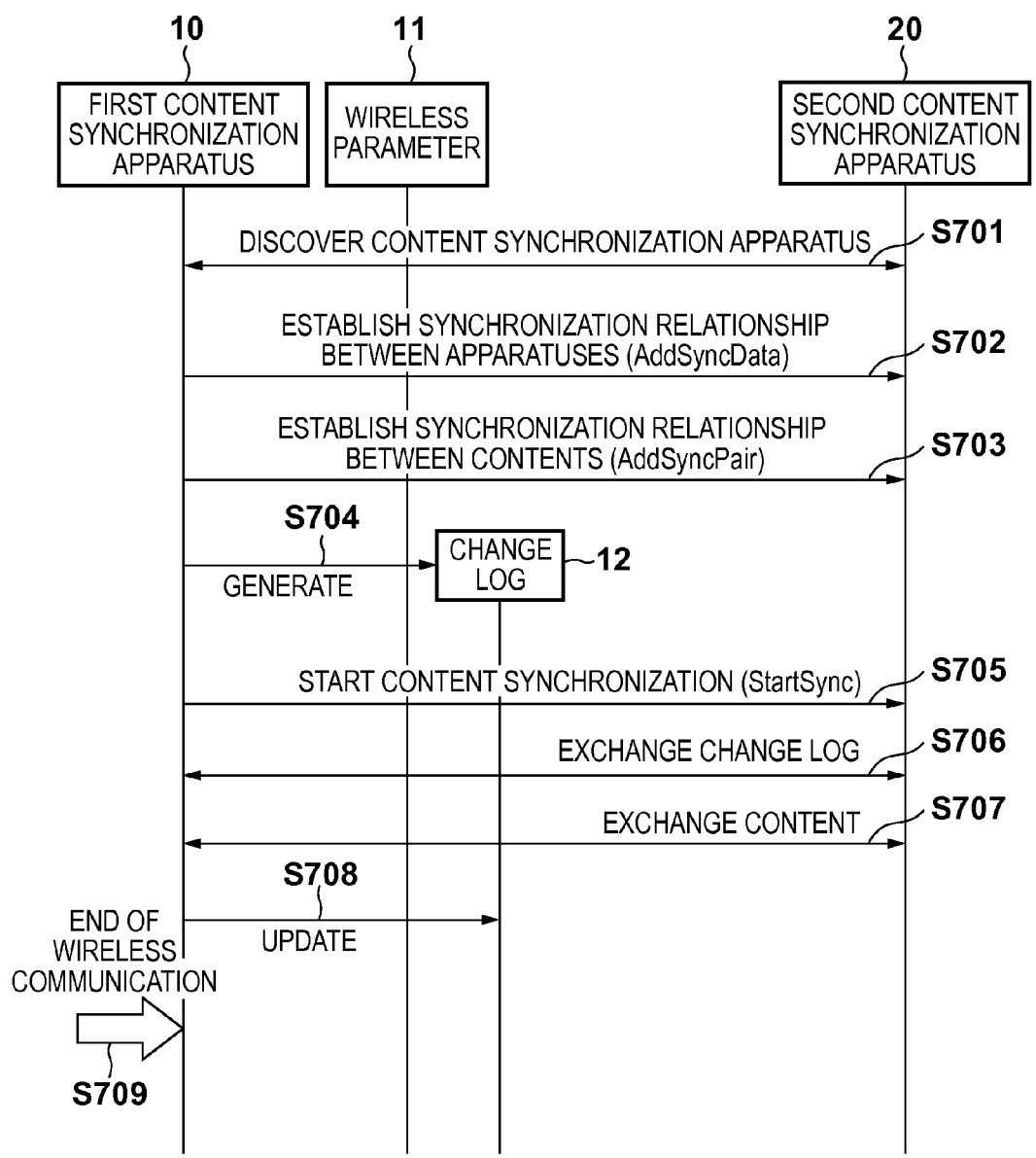
FIG. 7 is a sequence chart of content synchronization processing according to the first embodiment.

FIG. 7 illustrates the procedure of causing the first content synchronization apparatus 10 according to this embodiment to perform content synchronization with the second content synchronization apparatus 20. In step S701, the device discovery unit 306 of the first content synchronization apparatus 10 discovers the second content synchronization apparatus 20 having CSS.

In step S702, the content synchronization unit 310 of the first content synchronization apparatus 10 establishes the synchronization relationship with the second content synchronization apparatus 20. As a detailed example, the first content synchronization apparatus 10 transmits an AddSyncData action request of CSS to the second content synchronization apparatus 20.

In step S703, the content synchronization unit 310 of the first content synchronization apparatus 10 establishes an inter-content synchronization relationship with the second content synchronization apparatus 20. As a detailed example, the first content synchronization apparatus 10 transmits an AddSyncPair action request of CSS to the second content synchronization apparatus 20. A content in the second content synchronization apparatus 20 which is to be synchronized with a content in the first content synchronization apparatus 10 is thus decided. Step S703 is repetitively executed for each synchronization target content.

In step S704, the log manager 312 of the first content synchronization apparatus 10 generates the change log 12. The change log 12 is used to perform content synchronization with the second content synchronization apparatus 20. The log manager 312 generates the change log 12 based on information included in the AddSyncData action request in step S702 and the AddSyncPair action request in step S703. In this embodiment, the change log 12 is stored in the auxiliary storage device 204 of the first content synchronization apparatus 10.

In step S705, the content synchronization unit 310 of the first content synchronization apparatus 10 starts content synchronization with the second content synchronization apparatus 20. As a detailed example, the first content synchronization apparatus 10 transmits a StartSync action request of CSS to the second content synchronization apparatus 20.

In step S706, the content synchronization unit 310 of the first content synchronization apparatus 10 exchanges the change log 12 with the second content synchronization apparatus 20. In step S707, the content synchronization unit 310 of the first content synchronization apparatus 10 exchanges the content with the second content synchronization apparatus 20 based on the change log 12. When the content is exchanged, content synchronization is performed, and the synchronization state of the content changes.

In step S708, the log manager 312 of the first content synchronization apparatus 10 updates the change log 12 to reflect the synchronization state of the content changed in step S707. In step S709, the operation controller 304 of the first content synchronization apparatus 10 detects a wireless connection end instruction from the user.

Figure 8:
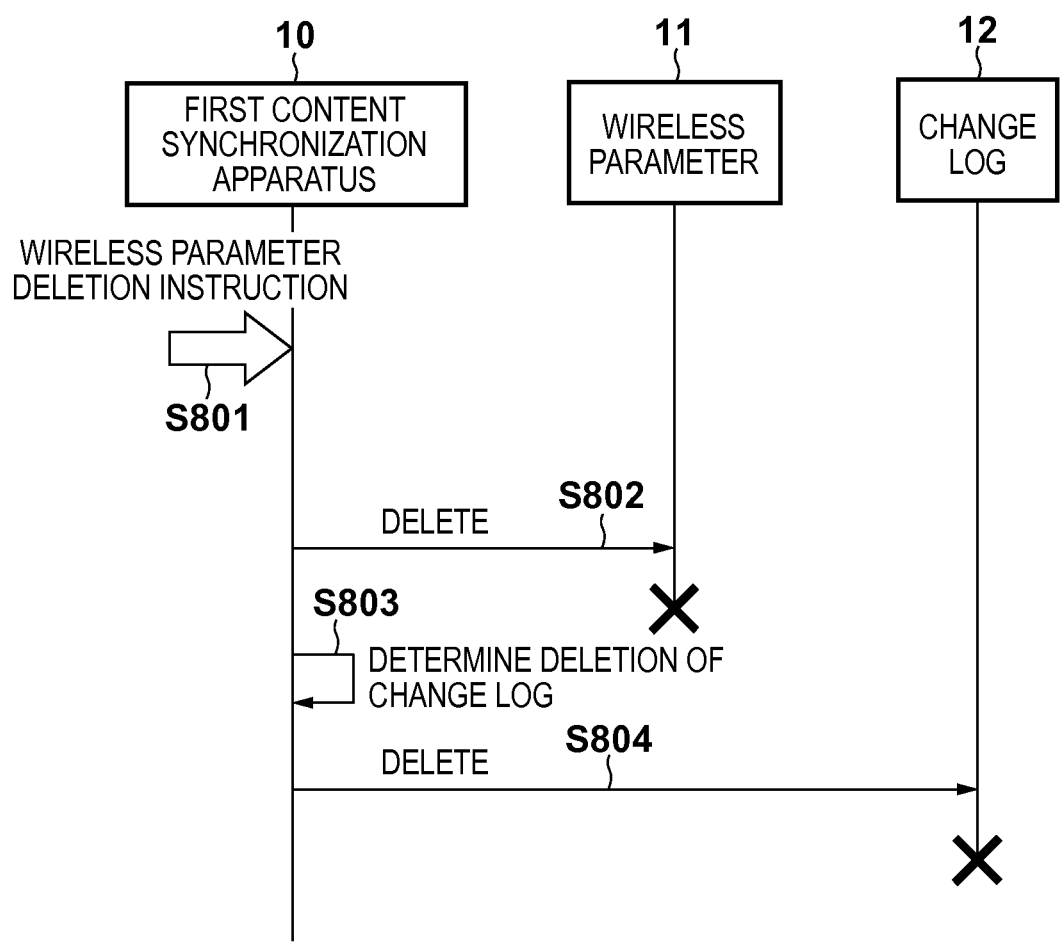
FIG. 8 is a sequence chart of change log deletion processing according to the first embodiment.

FIG. 8 illustrates the procedure of causing the first content synchronization apparatus 10 according to this embodiment to delete the change log 12. In step S801, the first content synchronization apparatus 10 detects a deletion instruction of the wireless parameter 11. The operation controller 304 may acquire the deletion instruction of the wireless parameter 11 from the user. Alternatively, the wireless parameter manager 311 may generate the deletion instruction of the wireless parameter 11. Details will be described later with reference to FIG. 9.

In step S802, the wireless parameter manager 311 of the first content synchronization apparatus 10 deletes the wireless parameter 11 acquired from the second content synchronization apparatus 20. The wireless parameter 11 is stored in the auxiliary storage device 204 of the first content synchronization apparatus 10.

In step S803, the deletion determination unit 313 of the first content synchronization apparatus 10 determines whether to delete the change log 12. Upon determining to delete the change log 12, in step S804, the log manager 312 of the first content synchronization apparatus 10 deletes the change log 12 used to perform synchronization with the second content synchronization apparatus 20. The change log 12 is stored in the auxiliary storage device 204 of the first content synchronization apparatus 10. Upon determining in step S803 not to delete the change log 12, the deletion processing in step S804 is not performed.

Figure 9:
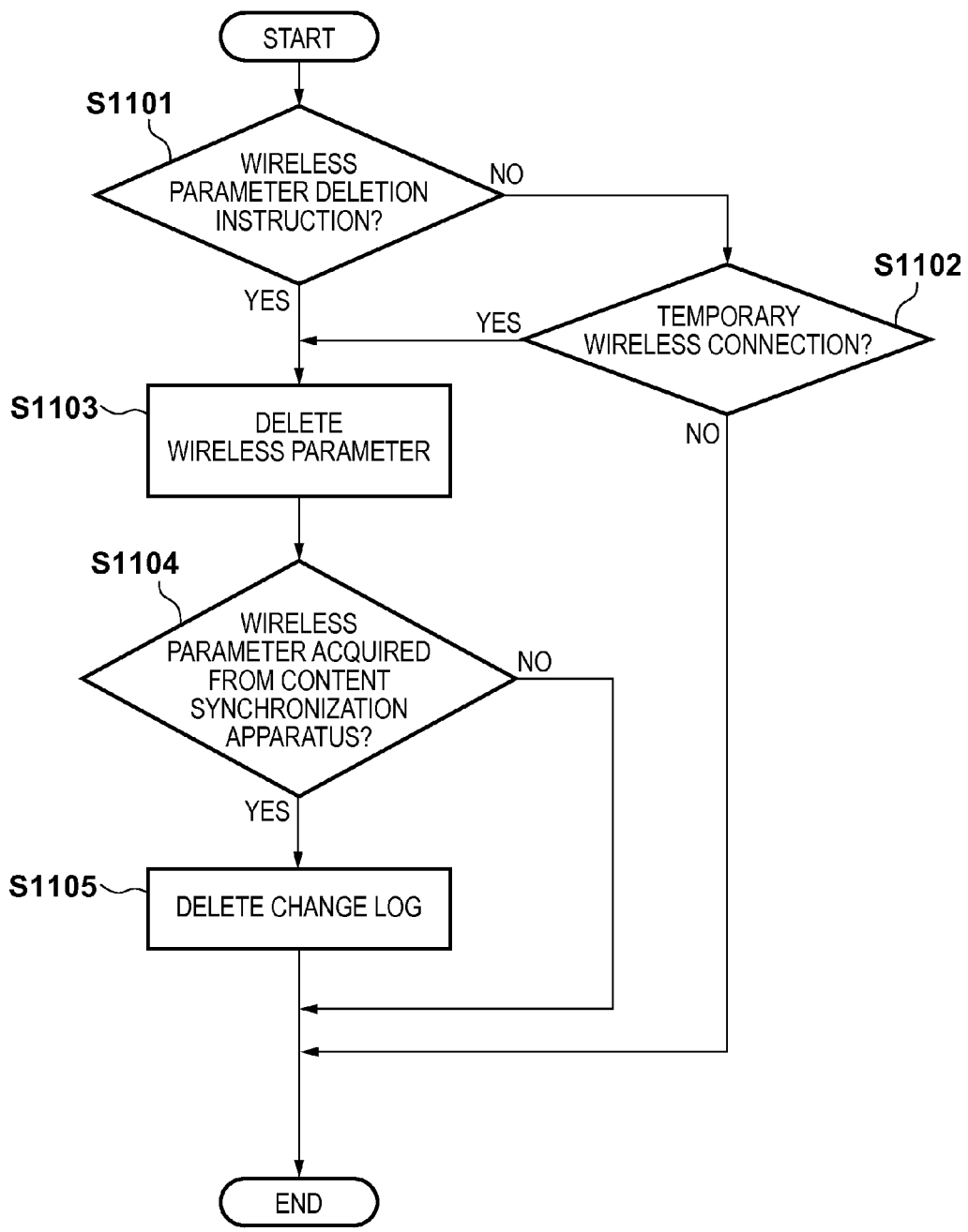
FIG. 9 is a flowchart of change log deletion processing according to the first embodiment.

The procedure of causing the first content synchronization apparatus 10 according to this embodiment to delete the change log 12 will be described below in more detail with reference to the flowchart of FIG. 9. The processing shown in FIG. 9 can start automatically or based on a user instruction. For example, the processing shown in FIG. 9 may start when content synchronization has ended. Alternatively, the processing shown in FIG. 9 may start periodically at a predetermined time interval.

In step S1101, the wireless parameter manager 311 confirms the presence/absence of a user instruction to delete the wireless parameter 11. If a deletion instruction exists, the process advances to step S1103. If no deletion instruction exists, the process advances to step S1102. In this embodiment, the wireless parameter manager 311 confirms a deletion instruction from the user. However, the wireless parameter manager 311 may confirm a deletion instruction from an apparatus other than the first content synchronization apparatus 10 or a deletion instruction from a program running on the first content synchronization apparatus 10.

In step S1102, the wireless parameter manager 311 determines whether the wireless communication connection in step S605 is temporary. As a detailed example, the wireless parameter manager 311 determines whether the connection type described in the Wi-Fi Direct information 404 of the wireless parameter 11 is temporary or persistent. If the connection is temporary, the wireless parameter manager 311 issues a deletion instruction of the wireless parameter 11. That is, in this case, the process advances to step S1103. If the connection is not temporary (persistent), the processing ends.

As described above, when the user has instructed to delete the wireless parameter, or when the wireless communication connection is temporary, the wireless parameter is deleted. If a plurality of wireless parameters are stored, whether to delete may be determined for each wireless parameter. If a plurality of wireless parameters to be deleted exist, processes in steps S1103 to S1107 to be described below are repeated.

In step S1103, the deletion determination unit 313 temporarily stores the wireless parameter 11 in the RAM 203. The wireless parameter 11 stored in the RAM 203 is referred to in steps S1103 and S1105. The wireless parameter manager 311 deletes the wireless parameter 11 from the auxiliary storage device 204 via the storage controller 305. After the end of the processing shown in FIG. 9, the wireless parameter 11 stored in the RAM 203 is deleted.

In step S1104, the deletion determination unit 313 determines whether the wireless parameter 11 deleted in step S1103 is a wireless parameter acquired from a content synchronization apparatus. If the wireless parameter 11 is a wireless parameter acquired from a content synchronization apparatus, the process advances to step S1105. If the wireless parameter 11 is not a wireless parameter acquired from a content synchronization apparatus, the process skips step S1105. In this embodiment, since the wireless parameter 11 is a wireless parameter acquired from the second content synchronization apparatus 20, the process advances to step S1105.

In step S1105, the log manager 312 deletes the change log 12 for the content synchronization apparatus that is the acquisition source of the wireless parameter 11. In this embodiment, since the wireless parameter 11 is a wireless parameter acquired from the second content synchronization apparatus 20, the log manager 312 deletes the change log 12 used to perform content synchronization with the second content synchronization apparatus 20.

As described above, when deleting the wireless parameter 11 acquired from the second content synchronization apparatus 20, the first content synchronization apparatus 10 deletes the change log 12 generated when the content has been synchronized with the second content synchronization apparatus 20.

For example, assume that the user of the first content synchronization apparatus 10 has determined not to perform, in the future, communication connection to the second content synchronization apparatus 20 with which content synchronization was performed in the past. In this case, the user instructs the first content synchronization apparatus 10 to delete the wireless parameter 11 for the second content synchronization apparatus 20. In this case, the first content synchronization apparatus 10 deletes the change log 12 for the second content synchronization apparatus 20 together. Since the unnecessary change log is deleted, the use amount of the storage area of the first content synchronization apparatus 10 can be decreased.

Additionally, if it is indicated that the connection to the second content synchronization apparatus 20 is temporary connection, the first content synchronization apparatus determines not to perform communication connection to the second content synchronization apparatus 20 in the future. In this case, the first content synchronization apparatus deletes the wireless parameter 11 for the second content synchronization apparatus 20. The first content synchronization apparatus also deletes the change log 12 for the second content synchronization apparatus 20 together. In this case, the user need not explicitly instruct deletion of the wireless parameter 11, convenience for the user is improved.

In this embodiment, the first content synchronization apparatus 10 deletes the change log 12 when deleting the wireless parameter 11. In the first embodiment, the relationship information 501, the partnership information 502, the pair group information 503, and the synchronization policy 504 are stored in the change log 12. However, these pieces of synchronization management information may be stored separately from the synchronization state 505. In this case, the first content synchronization apparatus 10 may delete these pieces of synchronization management information when deleting the change log 12. In addition, the first content synchronization apparatus 10 may delete arbitrary synchronization management information used to synchronize a content with the second content synchronization apparatus when deleting the change log 12.

[Second Embodiment]

The second embodiment will be described below. In this embodiment, a first content synchronization apparatus 10, a second content synchronization apparatus 20, and a third content synchronization apparatus 30 perform wireless communication connection in the same P2P group by Wi-Fi Direct. In the following example, the second content synchronization apparatus 20 (first other apparatus) is the P2P group owner of Wi-Fi Direct. The first content synchronization apparatus 10 (information processing apparatus) and the third content synchronization apparatus 30 (second other apparatus) are the P2P group clients of Wi-Fi Direct. The first content synchronization apparatus 10 wirelessly communicates with the second content synchronization apparatus 20 in accordance with a wireless parameter. The third content synchronization apparatus 30 also wirelessly communicates with the second content synchronization apparatus 20 in accordance with a wireless parameter. The first content synchronization apparatus 10 and the third content synchronization apparatus 30 can communicate via the second content synchronization apparatus 20.

The first content synchronization apparatus 10 can know that the third content synchronization apparatus 30 belongs to the same P2P group by referring to the P2P group ID of Wi-Fi Direct. In this embodiment, communication by Wi-Fi Direct is performed. However, WPS (Wi-Fi Protected Setup), WPSE (WPS Extension), ad hoc connection, or the like is also usable, as in the first embodiment.

An example of a use case of this embodiment is as follows. The user of the first content synchronization apparatus 10, who is, for example, out of the home, wants to synchronize a content with the second content synchronization apparatus 20 and the third content synchronization apparatus 30 which are owned by friends. At this time, the user connects the first content synchronization apparatus 10 of his/her own to the second content synchronization apparatus 20 of the friend by the push-button system of Wi-Fi Direct. The third content synchronization apparatus 30 is also connected to the second content synchronization apparatus 20 by Wi-Fi Direct. As described above, the first content synchronization apparatus 10, the second content synchronization apparatus 20, and the third content synchronization apparatus 30 perform wireless communication connection in the same P2P group.

The user instructs the first content synchronization apparatus 10 to start content synchronization with the second content synchronization apparatus 20. The user also instructs the first content synchronization apparatus 10 to start content synchronization with the third content synchronization apparatus 30. After the end of these content synchronizations, the user ends wireless connection of the first content synchronization apparatus 10.

After that, determining not to perform wireless communication connection to the second content synchronization apparatus 20 of the friend in the future, the user deletes an unnecessary wireless parameter 11 used for connection to the second content synchronization apparatus 20. In this embodiment, the first content synchronization apparatus 10 deletes a change log 12 generated to execute content synchronization with the second content synchronization apparatus 20 and a change log 13 generated to execute content synchronization with the third content synchronization apparatus 30 together.

Figure 10:
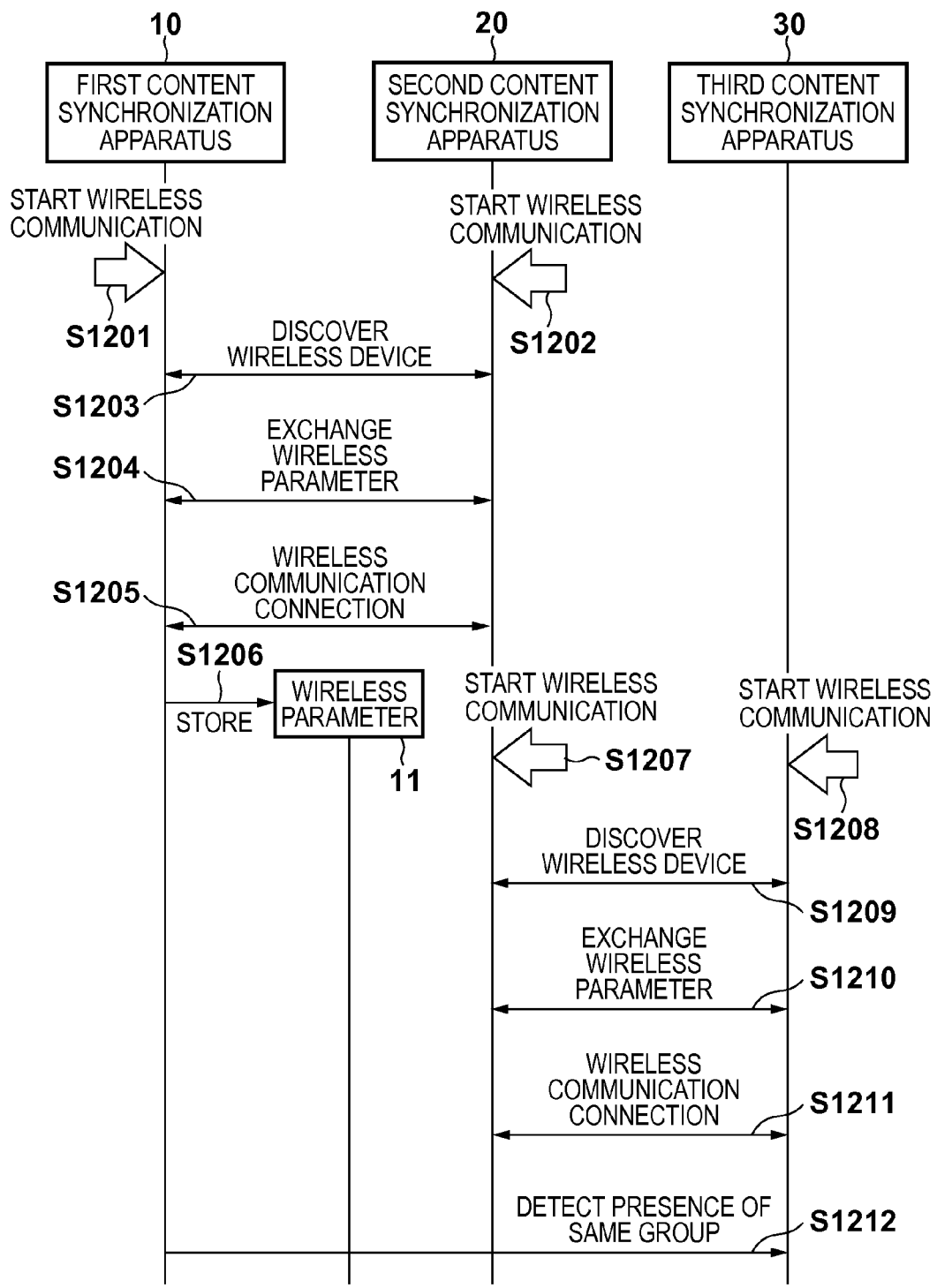
FIG. 10 is a sequence chart of wireless communication connection processing according to the second embodiment.

FIG. 10 illustrates the sequence of causing the first content synchronization apparatus 10 to start wireless communication connection with the second content synchronization apparatus 20 and the third content synchronization apparatus 30. Steps S1201 to S1206 are the same as steps S601 to S606 of the first embodiment. Steps S1207 to S1211 correspond to the sequence of causing the second content synchronization apparatus 20 to start wireless communication connection with the third content synchronization apparatus 30. This processing is performed as in steps S1201 to S1205.

In step S1212, a communication controller 302 of the first content synchronization apparatus 10 detects that the third content synchronization apparatus 30 belongs to the same P2P group. For example, the communication controller 302 of the first content synchronization apparatus 10 compares the P2P group ID of the third content synchronization apparatus 30 with the P2P group ID of its own. If the P2P group IDs match, it can be determined that the first content synchronization apparatus, the second content synchronization apparatus, and the third content synchronization apparatus belong to the same P2P group. However, this detection processing may be performed by another method. This detection processing may be performed when synchronizing a content, for example, after step S1315. Alternatively, this detection processing may be performed when deleting a change log, for example, before step S1405.

Figure 11:
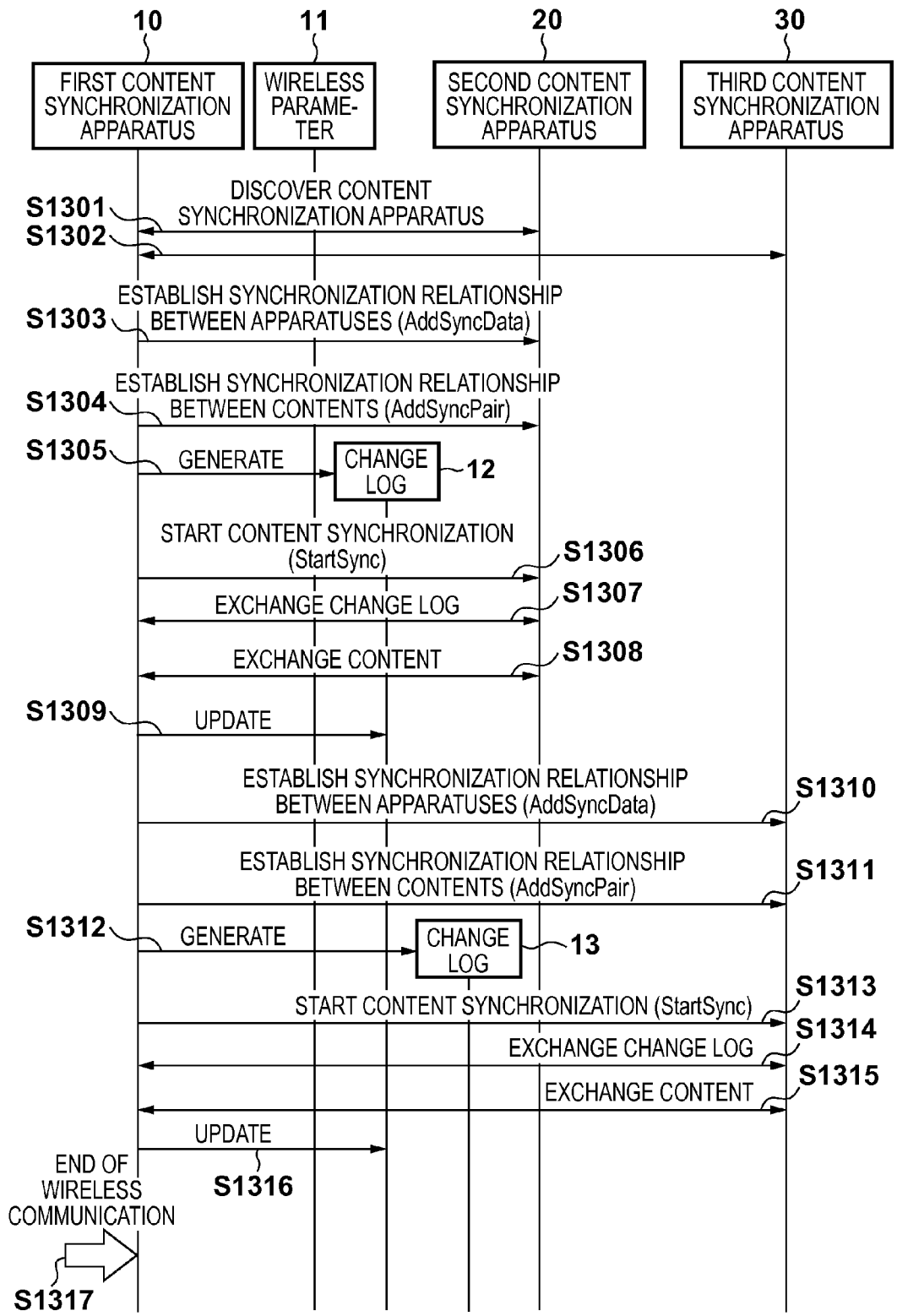
FIG. 11 is a sequence chart of content synchronization processing according to the second embodiment.

FIG. 11 illustrates the sequence of causing the first content synchronization apparatus 10 to perform content synchronization with the second content synchronization apparatus 20 and the third content synchronization apparatus 30. In the example to be described below, content synchronization with the second content synchronization apparatus 20 and content synchronization with the third content synchronization apparatus 30 are continuously performed. However, these content synchronizations may be performed separately.

Step S1301 is the same as step S701 of the first embodiment. In step S1302, a device discovery unit 306 of the first content synchronization apparatus 10 discovers the third content synchronization apparatus 30 having CSS. Steps S1303 to S1309 are the same as steps S702 to S708 of the first embodiment.

Steps S1310 to S1316 correspond to the sequence of causing the first content synchronization apparatus 10 to perform content synchronization with the third content synchronization apparatus 30, and are performed as in steps S1303 to S1309. However, communication between the first content synchronization apparatus and the third content synchronization apparatus is performed via the second content synchronization apparatus.

However, in step S1312, a log manager 312 of the first content synchronization apparatus 10 generates not the change log 12 but the change log 13 used to synchronize the content with the third content synchronization apparatus 30. The structure of the change log 13 is the same as that of the change log 12. Steps S1313 to S1316 are performed like steps S1306 to S1309.

FIG. 12 illustrates the sequence of causing the first content synchronization apparatus 10 to delete the wireless parameter 11. The processing shown in FIG. 12 can start automatically or based on a user instruction. For example, the processing shown in FIG. 12 may start when content synchronization has ended. Alternatively, the processing shown in FIG. 12 may start periodically at a predetermined time interval.

Steps S1401 to S1404 are the same as steps S801 to S804 of the first embodiment. In step S1405, a deletion determination unit 313 of the first content synchronization apparatus 10 determines whether a content synchronization apparatus belonging to the same P2P group as that of the second content synchronization apparatus 20 exists. If such a content synchronization apparatus does not exist, the processing in step S1406 is not performed.

In step S1406, the deletion determination unit 313 of the first content synchronization apparatus 10 deletes the change log for each of the content synchronization apparatuses belonging to the same P2P group as that of the second content synchronization apparatus 20. For example, in this embodiment, there exists the third content synchronization apparatus 30 that belongs to the same P2P group as that of the second content synchronization apparatus 20. In addition, there exists the change log 13 to synchronize a content with the third content synchronization apparatus 30. Hence, the deletion determination unit 313 of the first content synchronization apparatus 10 deletes the change log 13 for the third content synchronization apparatus 30.

As described above, when deleting the wireless parameter 11 acquired from the second content synchronization apparatus 20, the first content synchronization apparatus 10 deletes the change logs 12 and 13 for the second content synchronization apparatus 20 and the third content synchronization apparatus 30.

For example, assume that the user of the first content synchronization apparatus 10, who is, for example, out of the home, temporarily executes content synchronization with the second content synchronization apparatus 20 and the third content synchronization apparatus 30 owned by friends. Also assume that the user then determines not to perform wireless communication connection to the second content synchronization apparatus 20 in the future and deletes the unnecessary wireless parameter 11 of the second content synchronization apparatus 20. At this time, the first content synchronization apparatus 10 is assumed not to execute content synchronization with the third content synchronization apparatus 30 in the future as well as content synchronization with the second content synchronization apparatus 20.

In this embodiment, the first content synchronization apparatus 10 determines whether the third content synchronization apparatus 30 belongs to the same P2P group as that of the second content synchronization apparatus 20. That is, the first content synchronization apparatus 10 can determine that the connection to the third content synchronization apparatus 30 can be done using the wireless parameter 11 (via the second content synchronization apparatus 20). When deleting the wireless parameter 11, the first content synchronization apparatus 10 deletes the change log 13 together with the change log 12. The first content synchronization apparatus 10 can thus delete the change log 13 for the third content synchronization apparatus, which is assumed not to be used in the future.

In this embodiment, an example has been described in which the first, second, and the third content synchronization apparatuses synchronize a content. However, this embodiment is also applicable to a case in which four or more content synchronization apparatuses synchronize a content. For example, the first content synchronization apparatus 10 can specify a plurality of content synchronization apparatuses belonging to the same P2P group as that of the second content synchronization apparatus 20. When deleting the wireless parameter 11, the first content synchronization apparatus 10 deletes the change log for each of the specified content synchronization apparatuses.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-253137, filed Nov. 18, 2011, which is hereby incorporated by reference herein in its entirety.

What is claimed is:

1. An apparatus comprising:
   a holding memory configured to hold a communication parameter used to perform communication with a storage device configured to store content;
   a content data memory configured to store content;
   a change recording memory configured to store a record of change in the content stored in the content data memory;
   a transmitter configured to transmit the record of change to the storage device to synchronize content stored in the storage device with content stored in the content data memory; and
   a processor coupled to the holding memory, the content data memory, the change recording memory, and the transmitter, wherein the processor is programmed to function as:
      a determination unit configured to determine whether there is an instruction to delete a first communication parameter associated with a first storage device, wherein the first communication parameter associated with the first storage device is used to perform communication with the first storage device;
      a finding unit configured to find a first record of change associated with the first storage device, upon a determination by the determination unit that there is the instruction to delete the first communication parameter, wherein the first record of change, which indicates a change in the content stored in the content data memory, is used to synchronize content stored in the first storage device with the content stored in the content data memory; and
      a deletion unit configured to delete the first communication parameter from the holding memory and the first record of change from the change recording memory, upon the determination by the determination unit that there is the instruction to delete the first communication parameter.

2. The apparatus according to claim 1,
   wherein the determination unit is further configured to determine whether a type of connection to the first storage device is either a temporary connection or a persistent connection, based on the first communication parameter in the holding memory, and
   wherein the deletion unit is further configured to:
      delete the first communication parameter in the holding memory and the first record of change in the change recording memory, upon the determination by the determination unit that there is the instruction to delete the first communication parameter and that the type of connection to the first storage device is a temporary connection, and
      delete the first communication parameter in the holding memory and not delete the first record of change in the change recording memory, upon the determination by the determination unit that there is the instruction to delete the first communication parameter and that the type of connection to the first storage device is a persistent connection.

3. The apparatus according to claim 1, wherein
   the transmitter is further configured to transmit a second record of change to a second storage device via the first storage device, wherein the second record of change, which indicates a change in the content stored in the content data memory, is used to synchronize the content stored in the second storage device with the content stored in the content data memory,
   the finding unit is further configured to find the second record of change associated with the second storage device in addition to the first record of change associated with the first storage device, upon the determination by the determination unit that there is the instruction to delete the first communication parameter, and
   the deletion unit is further configured to delete the first communication parameter from the holding memory, the first record of change in from change recording memory, and the second record of change from the change recording memory, upon the determination by the determination unit that there is the instruction to delete the first communication parameter.

4. The apparatus according to claim 1, wherein the processor is further programmed to function as a synchronization unit configured to synchronize the content stored in the content data memory with the content stored in the storage device using the record of change stored in the change recording memory.

5. The apparatus according to claim 1,
wherein the determination unit is further configured to determine whether or not there is an instruction to delete at least one of a SSID, information indicating an encryption communication method, key information for an encrypted communication, information indicating whether a connection is temporary or persistent, or a P2P group ID, and
wherein the deletion unit is further configured to delete the at least one of the SSID, the information indicating an encryption communication method, the key information for an encrypted communication, the information indicating whether a connection is temporary or persistent, or the P2P group ID, and the first record of change in the change recording memory, upon the determination by the determination unit that there is the instruction to delete the at least one of a SSID, the information indicating an encryption communication method, the key information for an encrypted communication, the information indicating whether a connection is temporary or persistent, or the P2P group ID.

6. A method comprising:
a holding step of holding, in a holding memory, a communication parameter used to perform communication with a storage device configured to store content;
a recording step of storing a record of change in content stored in a content data memory, in a change recording memory;
a transmission step of transmitting the record of change to the storage device to synchronize content stored in the storage device with content stored in the content data memory;
a determining step of determining whether there is an instruction to delete a first communication parameter associated with a first storage device, wherein the first communication parameter associated with the first storage device is used to perform communication with the first storage device;
a finding step of finding a first record of change associated with the first storage device, upon a determination in the determining step that there is the instruction to delete the first communication parameter, wherein the first record of change, which indicates a change in the content stored in the content data memory, is used to synchronize content stored in the first storage device with the content stored in the content data memory; and
a deletion step of deleting the first communication parameter from the holding memory and the first record of change from the change recording memory, upon the determination in the determining step that that there is the instruction to delete the first communication parameter.

7. The method according to claim 6,
wherein, in the determining step, type information indicating whether a type of connection to the first storage device is a temporary connection or a persistent connection, based on the first communication parameter in the holding memory is determined, and
wherein the deletion step includes:
deleting the first communication parameter in the holding memory and the first record of change in the change recording memory, upon the determination in the determining step that there is the instruction to delete the first communication parameter and that the type of connection to the first storage device is a temporary connection, and
deleting the first communication parameter in the holding memory and not delete the first record of change in the change recording memory, upon the determination in the determining step that there is the instruction to delete the first communication parameter and that the type of connection to the first storage device is a persistent connection.

8. The method according to claim 6, wherein
the transmission step includes transmitting a second record of change to a second storage device via the first storage device, wherein the second record of change, which indicates a change in the content stored in the content data memory, is used to synchronize the content stored in the second storage device with the content stored in the content data memory;
the finding step includes finding the second record of change associated with the second storage device in addition to the first record of change associated with the first storage device, upon the determination in the determining step that there is the instruction to delete the first communication parameter; and
the deletion step includes deleting the first communication parameter from the holding memory, the first record of change in from change recording memory, and the second record of change from the change recording memory, upon the determination in the determining step that there is the instruction to delete the first communication parameter.

9. The method according to claim 6, further comprising a synchronization step of synchronizing the content stored in the content data memory with the content stored in the storage device using the record of change stored in the recording step.

10. The method according to claim 6,
wherein the determining step includes determining whether or not there is an instruction to delete at least one of a SSID, information indicating an encryption communication method, key information for an encrypted communication, information indicating whether a connection is temporary or persistent, or a P2P group ID, and
wherein the deletion step includes deleting the at least one of the SSID, the information indicating an encryption communication method, the key information for an encrypted communication, the information indicating whether a connection is temporary or persistent, or the P2P group ID, and the first record of change in the change recording memory, upon the determination in the determining step that there is the instruction to delete the at least one of a SSID, the information indicating an encryption communication method, the key information for an encrypted communication, the information indicating whether a connection is temporary or persistent, or the P2P group ID.

11. A non-transitory computer-readable storage medium storing a program executable by a computer to perform a method comprising:
a holding step of holding, in a holding memory, a communication parameter used to perform communication with a storage device configured to store content;
a recording step of storing a record of change in the content stored in a content data memory, in a change recording memory;
a transmission step of transmitting the record of change to the storage device to synchronize content stored in the storage device with content stored in the content data memory;

a determining step of determining whether there is an instruction to delete a first communication parameter associated with a first storage device, wherein the first communication parameter associated with the first storage device is used to perform communication with the first storage device;

a finding step of finding a first record of change associated with the first storage device, upon a determination in the determining step that there is the instruction to delete the first communication parameter, wherein the first record of change, which indicates a change in the content stored in the content data memory, is used to synchronize content stored in the first storage device with the content stored in the content data memory; and a deletion step of deleting the first communication parameter from the holding memory and the first record of change from the change recording memory, upon the determination in the determining step that there is the instruction to delete the first communication parameter.

12. The storage medium according to claim 11, wherein, in the determining step, type information indicating whether a type of connection to the first storage device is a temporary connection or a persistent connection, based on the first communication parameter in the holding memory is determined, and wherein the deletion step includes:

deleting the first communication parameter in the holding memory and the first record of change in the change recording memory, upon the determination in the determining step that there is the instruction to delete the first communication parameter and that the type of connection to the first storage device is a temporary connection, and deleting the first communication parameter in the holding memory and not delete the first record of change in the change recording memory, upon the determination in the determining step that there is the instruction to delete the first communication parameter and that the type of connection to the first storage device is a persistent connection.

13. The storage medium according to claim 11, wherein the transmission step includes transmitting a second record of change to a second storage device via the first storage device, wherein the second record of change, which indicates a change in the content stored in the content data memory, is used to synchronize the content stored in the second storage device with the content stored in the content data memory;

the finding step includes finding the second record of change associated with the second storage device in addition to the first record of change associated with the first storage device, upon the determination in the determining step that there is the instruction to delete the first communication parameter; and the deletion step includes deleting the first communication parameter from the holding memory, the first record of change in from change recording memory, and the second record of change from the change recording memory, upon the determination in the determining step that there is the instruction to delete the first communication parameter.

14. The storage medium according to claim 11, wherein the method further comprises a synchronization step of synchronizing the content stored in the content data memory with the content stored in the storage device using the record of change stored in the recording step.

15. The medium according to claim 11, wherein the determining step includes determining whether or not there is an instruction to delete at least one of a SSID, information indicating an encryption communication method, key information for an encrypted communication, information indicating whether a connection is temporary or persistent, or a P2P group ID, and wherein the deletion step includes deleting the at least one of the SSID, the information indicating an encryption communication method, the key information for an encrypted communication, the information indicating whether a connection is temporary or persistent, or the P2P group ID, and the first record of change in the change recording memory, upon the determination in the determining step that there is the instruction to delete the at least one of a SSID, the information indicating an encryption communication method, the key information for an encrypted communication, the information indicating whether a connection is temporary or persistent, or the P2P group ID.

* * * * *